United States Patent
Candelaria et al.

(10) Patent No.: US 11,870,166 B2
(45) Date of Patent: Jan. 9, 2024

(54) LOW RESISTIVITY TAP CLAMP

(71) Applicant: Hubbell Incorporated, Shelton, CT (US)

(72) Inventors: Adrian Beau Candelaria, Montevallo, AL (US); James Marc Hansen, Hoover, AL (US)

(73) Assignee: Hubbell Incorporated, Shelton, CT (US)

( * ) Notice: Subject to any disclaimer, the term of this patent is extended or adjusted under 35 U.S.C. 154(b) by 217 days.

(21) Appl. No.: 17/406,680

(22) Filed: Aug. 19, 2021

(65) Prior Publication Data

US 2022/0059953 A1 Feb. 24, 2022

Related U.S. Application Data

(60) Provisional application No. 63/067,631, filed on Aug. 19, 2020.

(51) Int. Cl.
*H01R 11/15* (2006.01)
*H01B 1/02* (2006.01)
*H01R 11/05* (2006.01)

(52) U.S. Cl.
CPC .............. *H01R 11/05* (2013.01); *H01B 1/023* (2013.01); *H01B 1/026* (2013.01)

(58) Field of Classification Search
CPC ........ H01R 11/15; H01R 13/03; H01R 11/14; H01B 1/023; H01B 1/026; H02G 1/02
See application file for complete search history.

(56) References Cited

U.S. PATENT DOCUMENTS

| | | | | |
|---|---|---|---|---|
| 2,191,258 A | * | 2/1940 | Matthysse | H01R 11/15 439/805 |
| 2,448,402 A | * | 8/1948 | Thompson | H01R 11/15 439/817 |
| 2,738,480 A | | 3/1956 | Hubbard | |
| 2,867,787 A | | 1/1959 | Nilsson | |
| 3,075,166 A | | 1/1963 | Peek | |
| 3,097,037 A | | 7/1963 | Gainer et al. | |
| 3,358,263 A | | 12/1967 | Reeves | |
| 4,865,484 A | * | 9/1989 | McConnell | F16B 7/04 248/286.1 |
| 4,911,572 A | * | 3/1990 | Williams | H01R 11/15 403/399 |
| 4,934,949 A | | 6/1990 | Chameski et al. | |
| 5,286,211 A | | 2/1994 | McIntosh | |
| 5,556,299 A | * | 9/1996 | Finke | H01R 11/15 439/803 |

(Continued)

FOREIGN PATENT DOCUMENTS

WO WO-2018044745 A1 * 3/2018 ............ H01R 11/14

OTHER PUBLICATIONS

PCT/US2021/046680 International Search Report and Written Opinion dated Nov. 9, 2021 (14 pages).

*Primary Examiner* — Jean F Duverne
(74) *Attorney, Agent, or Firm* — Robinson + Cole LLP

(57) ABSTRACT

Clamps and methods disclosed herein can help to provide efficient electrical communication between a first conductor and a second conductor. An example clamp includes a main housing portion that includes a first surface, a second surface, a body, and an insert, the insert providing electrical communication between the first surface and the second surface; a clamp member; and a fastener.

20 Claims, 6 Drawing Sheets

(56) References Cited

U.S. PATENT DOCUMENTS 8,932,087 B2 * 1/2015 Neal .................... H01R 11/14
439/776
2012/0142231 A1 6/2012 De France

* cited by examiner

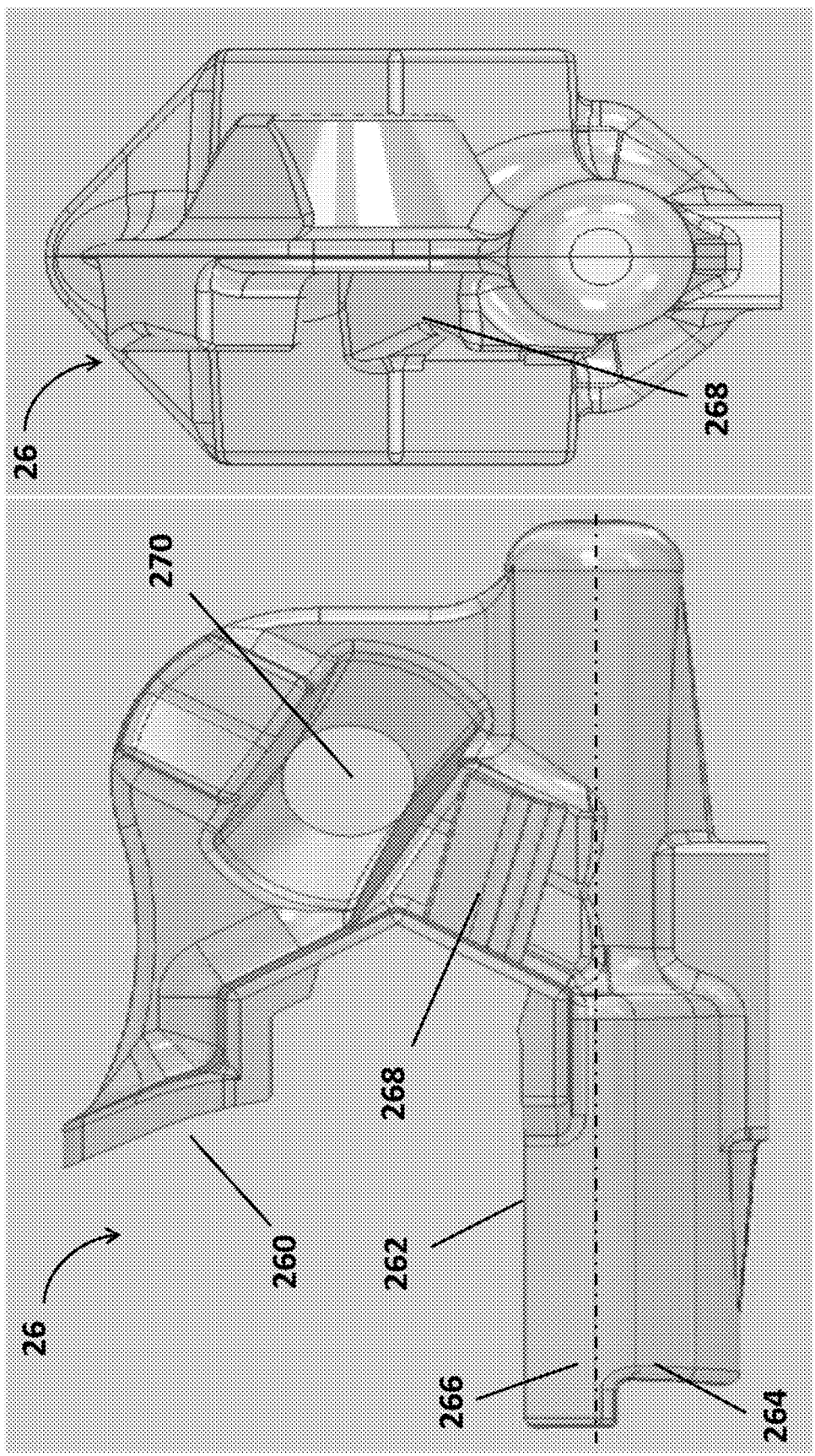

LOW RESISTIVITY TAP CLAMP

CROSS-REFERENCE TO RELATED APPLICATIONS

This application claims priority to U.S. Provisional Patent Application No. 63/067,631, filed Aug. 19, 2020, which is incorporated herein by reference in its entirety.

BACKGROUND

The present disclosure relates to connectors for electrical conductors, and particularly to low resistivity tap clamps.

SUMMARY

In one aspect, the disclosure provides a clamp for providing electrical communication between a first conductor and a second conductor where the clamp includes a main housing portion including a first surface, a second surface, a body, and an insert, the insert providing electrical communication between the first surface and the second surface.

In another aspect, the disclosure provides a clamp for providing electrical communication between a first conductor and a second conductor where the clamp includes a main housing portion including a body and an insert, the insert including a first surface and a second surface and having a lower resistivity relative to the body.

In another aspect, the disclosure provides a method for providing electrical communication between a first conductor and a second conductor. The method includes attaching the first conductor to a main housing portion. The method also includes positioning the second conductor between a second surface of the main housing portion and a first clamp surface of a clamp member.

These, as well as other aspects, advantages, and alternatives, will become apparent to those of ordinary skill in the art by reading the following detailed description and accompanying drawings.

BRIEF DESCRIPTION OF THE DRAWINGS

FIG. 3 is a side view of an example body.
FIG. 4 is a first end view of an example body.

DETAILED DESCRIPTION

I. Introduction

Figure 1:
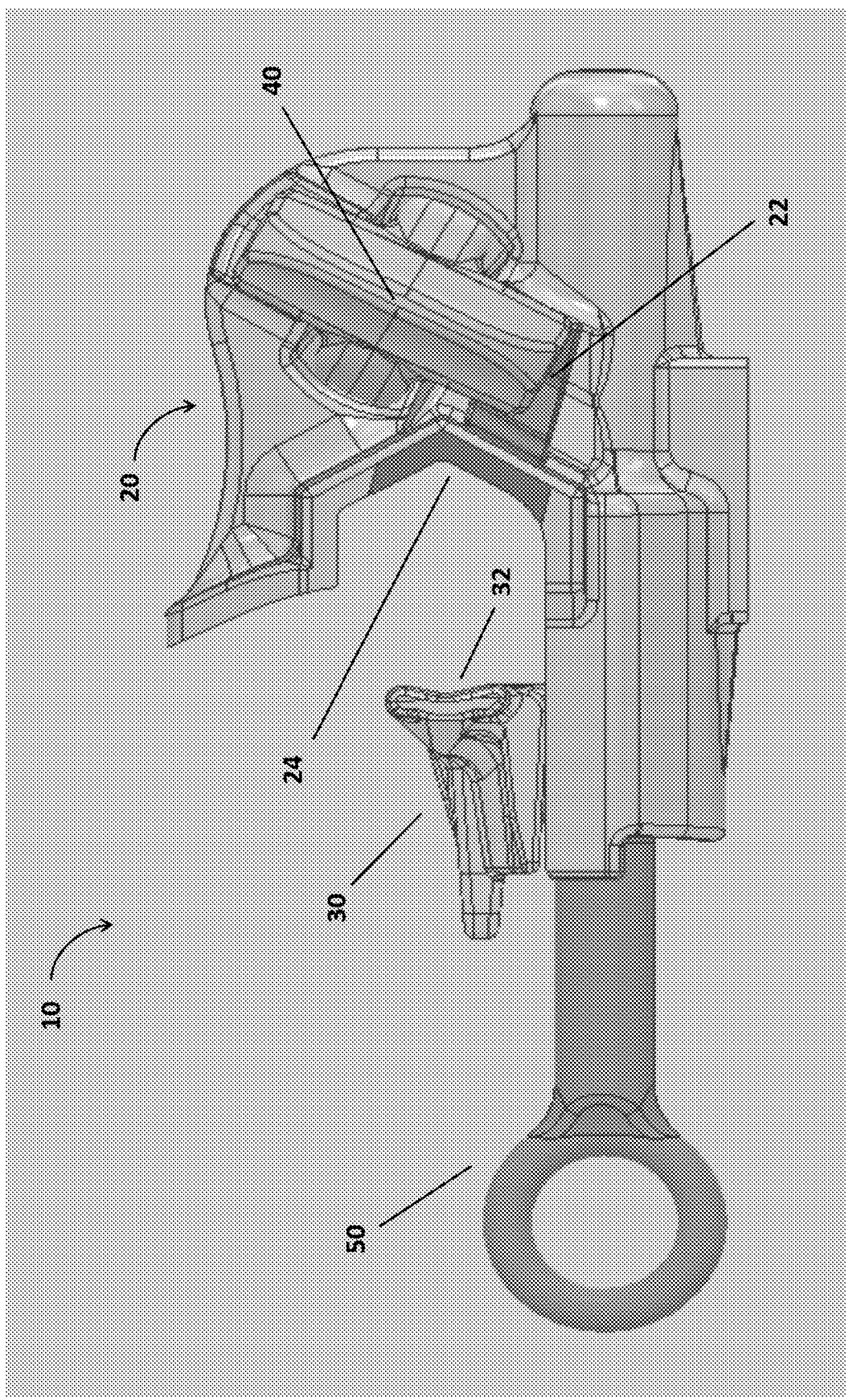
FIG. 1 is a side view of an example clamp.

Conductor tap clamps are hot line connectors for providing electrical communication with or tapping into a main power line. For example, conductor tap clamps can attach a first conductor to a second, energized, conductor engaged with a transformer. Line connection with tapping typically uses conductive but high resistivity materials to maintain strength of the connector. The higher resistivity of the tap clamp can increase the heat generation of the body of the connector. To mitigate the increase in heat, more mass can be used in manufacturing a connector, thereby allowing for a wider area of electrical potential and decreasing the overall heat generation. Disclosed herein are connectors that can overcome this problem by including different materials in the connector, which can adjust the electrical properties of the connector.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example, "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

II. Example Structures

FIG. 1 illustrates a clamp 10 for electrically connecting a first conductor and a second conductor in accordance with an example embodiment. In the illustrated embodiment, the clamp 10 is a tap clamp or a hot line clamp, and the clamp 10 includes a main housing portion 20, a clamp member or keeper 30, a fastener 40, and a linear actuator 50.

Figure 2:
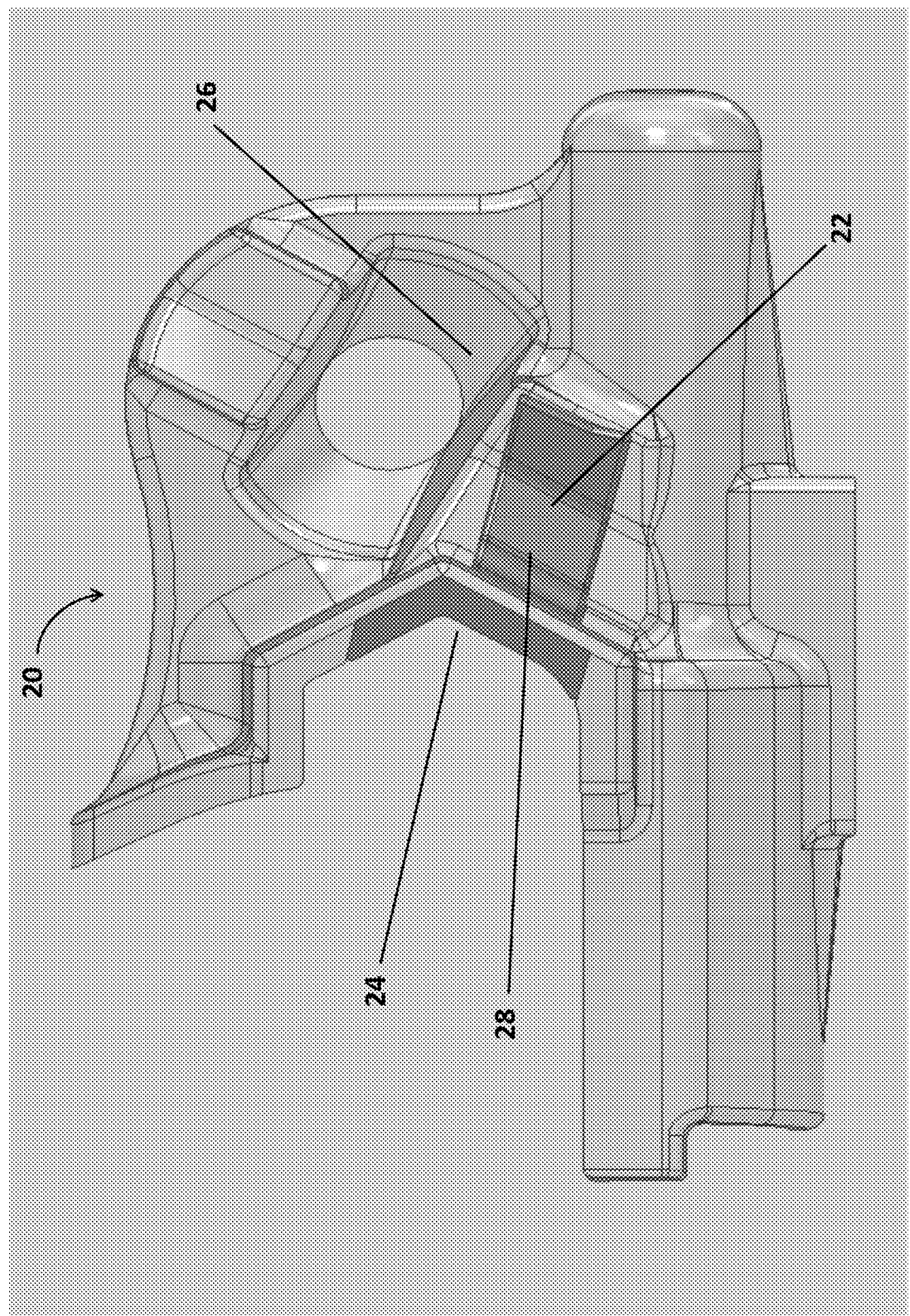
FIG. 2 is a side view of an example main housing portion.

The main housing portion 20 can provide electrical communication between the first conductor and the second conductor by, e.g., securing each of the first conductor and the second conductor to the main housing portion 20 of the clamp 10. As shown in FIGS. 1 and 2, the main housing portion 20 includes a first surface 22 and a second surface 24. The first surface 22 is sized to receive a portion of a conductor (e.g., the first conductor). The second surface 24 is also sized to receive a portion of a conductor (e.g., the second conductor). The second surface 24 can form at least a portion of a cavity of the main housing portion 20. In some embodiments, the first surface 22, the second surface 24, or both are a curved surface.

The main housing portion 20 includes components that aid in electrical communication between the first conductor and the second conductor. For example, the main housing portion 20 includes a body 26 and an insert 28. The insert 28 can provide electrical communication between the first surface 22 and the second surface 24. In addition, the insert 28 can make up at least a portion of the first surface 22 and at least a portion of the second surface 24. For example, in some embodiments, the main housing portion 20 includes a body 26 and an insert 28, where the insert 28 includes the first surface 22 and the second surface 24. The body 26 may also make up at least a portion of the first surface 22 and at least a portion of the second surface 24, and may provide electrical communication between the first conductor and the second conductor. In some embodiments, the insert 28 makes up the entirety of the first surface 22 and the entirety of the second surface 24.

The main housing portion 20 is made from different conductive materials. For example, the body 26 and the insert 28 are each individually made from different materials. Accordingly, the body 26 and the insert 28 can each individually have different electrical properties (e.g., conductivity) that allow the clamp 10 to be a more effective and efficient connector. For example, the body 26 can have a resistivity that is different from the insert 28, and as such can have a conductivity different from that of the insert 28. The difference in resistivity can be used to adapt a conductive path along the main housing portion 20. In some embodiments, the body 26 has a resistivity that is greater than the resistivity of the insert 28. For example, the body can have a resistivity that is at least 1.5× greater, at least 2× greater, at least 2.5× greater, at least 3× greater, at least 3.5× greater, at least 4× greater, at least 4.5× greater, at least 5× greater, at least 10× greater, or at least 20× greater than the resistivity of the insert 28. In some embodiments, the body 26 has a resistivity that is about 1.5× greater to about 20× greater than the resistivity of the insert 28, such as about 1.5× greater to about 10× greater than the resistivity of the insert 28, about 1.5× greater to about 5× greater than the resistivity of the insert 28, or about 1.5× greater to about 4× greater than the resistivity of the insert 28. In embodiments where the insert 28 has a lower resistivity compared to the body 26, the insert 28 can concentrate electrical potential to the insert 28 relative to the body 26—thereby creating a conductive path along the insert 28. By doing so, the insert 28 can increase work efficiency of the clamp 10 and main housing portion 20 thereof, and thus can reduce heat generation in the main housing portion 20 and the body 26 compared to if the insert 28 wasn't present. This enables the clamp 10 to handle higher loads of electricity, and do so without adding significantly to the overall mass of the clamp 10. This provides the clamp 10 to have increased long-term stability.

As mentioned above, the insert 28 can have a useful resistivity, which can be used to concentrate a conductive path along the insert 28. For example, the insert 28 can have a resistivity of less than $5 \times 10^{-6}$ ohm-cm, less than $4.5 \times 10^{-6}$ ohm-cm, less than $4 \times 10^{-6}$ ohm-cm, less than $3.5 \times 10^{-6}$ ohm-cm, or less than $3 \times 10^{-6}$ ohm-cm. In some embodiments, the insert 28 has a resistivity greater than $0.1 \times 10^{-6}$ ohm-cm, greater than $0.25 \times 10^{-6}$ ohm-cm, greater than $0.5 \times 10^{-6}$ ohm-cm, greater than $0.75 \times 10^{-6}$ ohm-cm, or greater than $1 \times 10^{-6}$ ohm-cm. In some embodiments, the insert 28 has a resistivity of about $0.1 \times 10^{-6}$ ohm-cm to about $5 \times 10^{-6}$ ohm-cm, such as about $0.25 \times 10^{-6}$ ohm-cm to about $4 \times 10^{-6}$ ohm-cm, about $0.5 \times 10^{-6}$ ohm-cm to about $3.5 \times 10^{-6}$ ohm-cm, or about $1 \times 10^{-6}$ ohm-cm to about $3 \times 10^{-6}$ ohm-cm.

The insert 28 can be made from any suitable material that allows the disclosed clamp 10 to effectively provide electrical communication between a first conductor and a second conductor as disclosed herein. In some embodiments, the insert 28 comprises copper, aluminum, or a combination thereof. In some embodiments, the insert 28 includes a material with a high purity. For example, the insert 28 can include copper, aluminum, or a combination thereof at greater than 97% by weight of the insert 28, greater than 98% by weight of the insert 28, or greater than 99% by weight of the insert 28. In some embodiments, the insert 28 includes copper, aluminum, or a combination thereof at less than 99.99% by weight of the insert 28, less than 99.98% by weight of the insert 28, less than 99.97% by weight of the insert 28, or less than 99.96% by weight of the insert 28. In some embodiments, the insert 28 includes copper aluminum, or a combination thereof at about 97% to about 99.99% by weight of the insert 28, such as about 98% to about 99.99% by weight of the insert 28, about 98% to about 99.98% by weight of the insert 28, or about 99% to about 99.99% by weight of the insert 28. In some embodiments, the insert 28 comprises an aluminum alloy of AL1100-H18 or a copper alloy of C80100. In some embodiments, the insert 28 consists essentially of an aluminum alloy of AL1100-H18 or a copper alloy of C80100. In some embodiments, the insert 28 consists of an aluminum alloy of AL1100-H18 or a copper alloy of C80100.

The body 26 can be made from any suitable material that allows the disclosed clamp 10 to effectively provide electrical communication between a first conductor and a second conductor as disclosed herein. The body 26 can comprise aluminum. The body 26 can have a lower purity compared to the purity of the insert 28. For example, the body 26 can include aluminum at less than 97% by weight of the body 26, less than 96% by weight of the body 26, less than 95% by weight of the body 26, or less than 94% by weight of the body 26. In some embodiments, the body 26 includes aluminum at greater than 85% by weight of the body 26, greater than 86% by weight of the body 26, greater than 87% by weight of the body 26, or greater than 88% by weight of the body 26. In some embodiments, the body 26 includes aluminum at about 85% to about 97% by weight of the body 26, such as about 85% to about 95% by weight of the body 26, or about 88% to about 94% by weight of the body 26. In some embodiments, the body 26 includes an aluminum alloy of A356-T6. In some embodiments, the body 26 consists essentially of an aluminum alloy of A356-T6. In some embodiments, the body 26 consists of an aluminum alloy of A356-T6.

Figure 5:
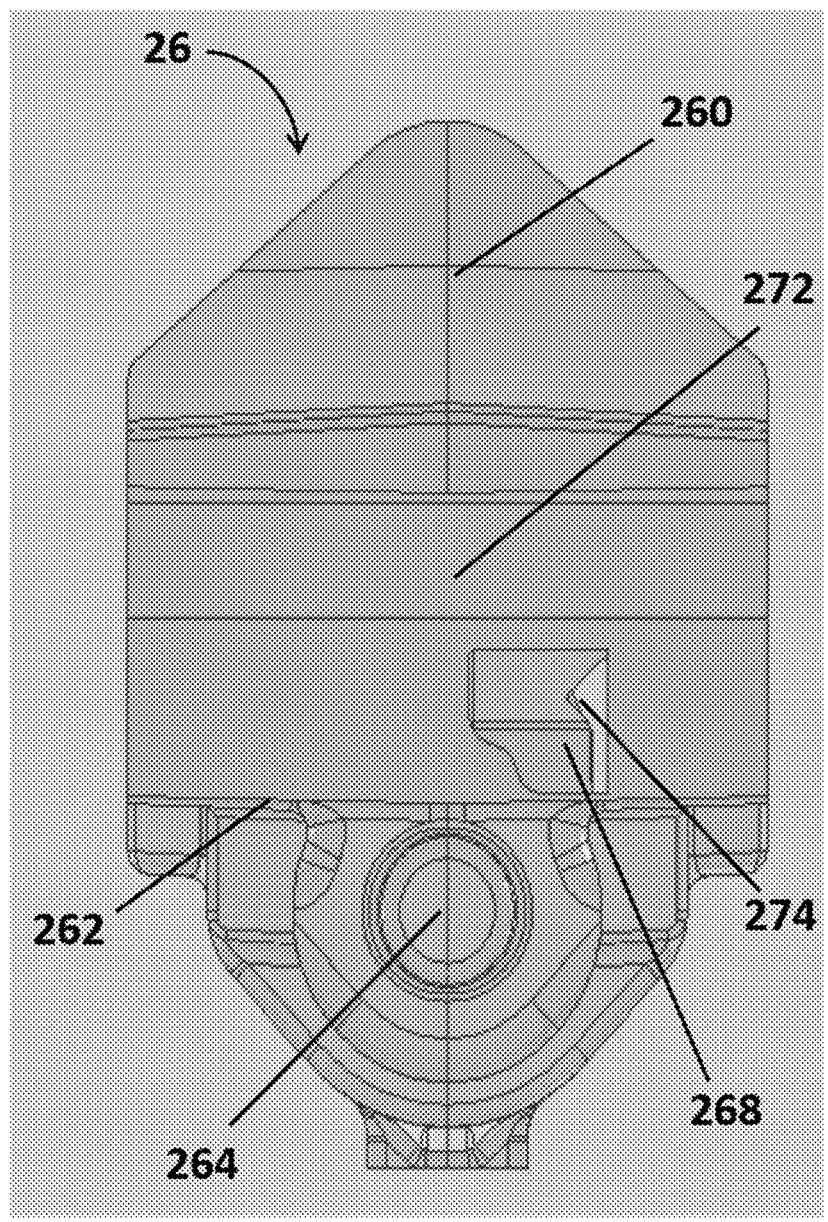
FIG. 5 is a second end view of an example body.

The main housing portion 20 can be manufactured such that the body 26 and the insert 28 are two distinct castings. An example embodiment of the body 26 (without the insert 28) is shown in FIGS. 3-5. As shown in FIG. 3, the body 26 can have an inclined surface 260 and an upper surface 262, which can form a cavity where the second surface 24 can be positioned therebetween. The inclined surface 260 and the upper surface 262 of the body 26 can be positioned such that the clamp member 30 can be disposed within the cavity. The body 26 can also include a bore 264. The bore 264 can extend along a longitudinal axis 266 of the body 26. The bore 264 can be configured to receive the linear actuator 50. In addition, the body 26 can include an aperture 270 to receive the fastener 40.

Figures 6, 7:
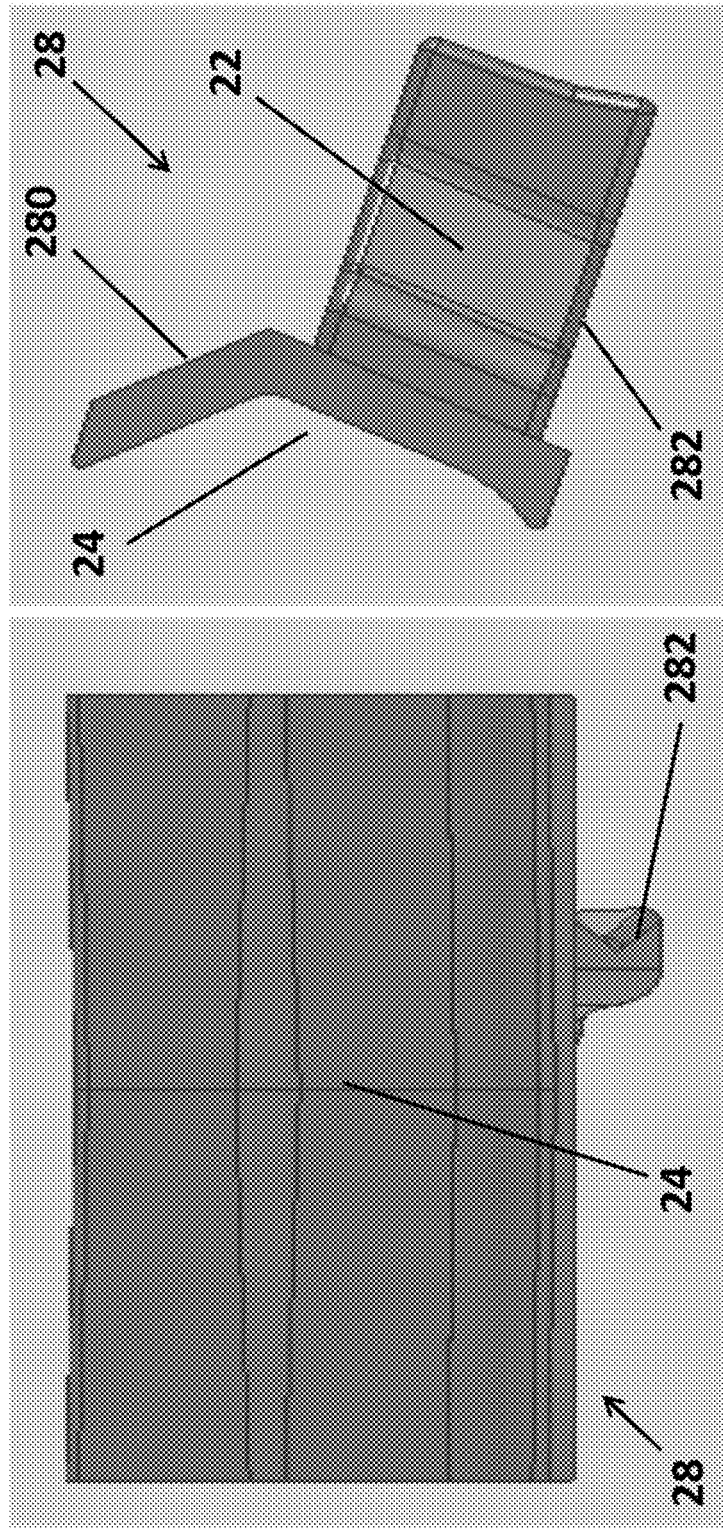
FIG. 6 is a first end view of an example insert.
FIG. 7 is a side view of an example insert.
Figure 8:
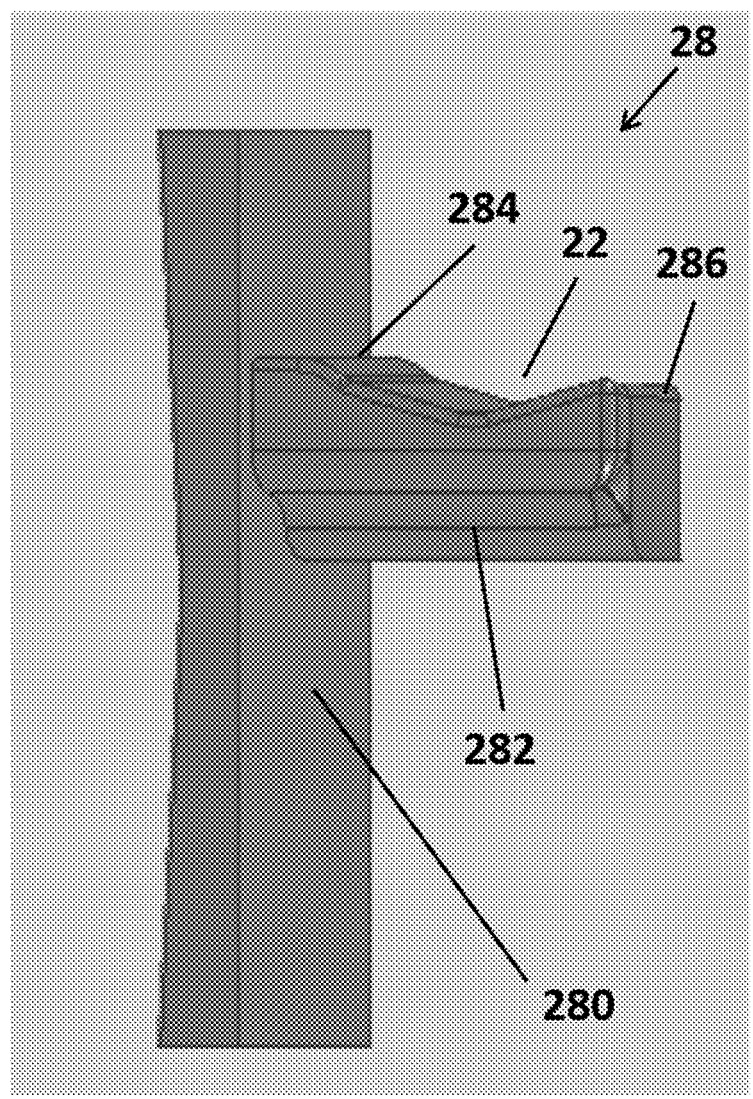
FIG. 8 is a perspective view of an example insert.

The body 26 and the insert 28 can have complementary shapes that can allow for advantageous contact between the two. For example, the body 26 can include peripheral surfaces that are inclined to mate with peripheral surfaces of the insert 28. As shown in FIGS. 3-5, the body 26 can have an opening 268 to receive the insert 28. The opening 268 of the body 26 can be shaped in a complementary manner relative to the shape of the insert 28. An example embodiment of the insert 28 is shown in FIGS. 6-8. The illustrated embodiment of the insert 28 includes an interface surface 280 on the opposite side of the second surface 24 (or a portion thereof). The interface surface 280 of the insert 28 can contact an interface surface 272 of the body 26. In addition, the illustrated embodiment of the insert 28 includes a portion 282. The portion 282 of the insert 28 can include the first surface 22 (or a portion thereof). The opposite side of the first surface 22 of the portion 282 can contact a portion of the body 26. For example, the portion 282 of the insert 28 can engage the recess 274 of the body 26. The portion 282 of the insert 28 can include a first end 284 and a second end 286. The first end 284 can contact a portion of the interface surface 280 of the insert 28. The second end 286 can contact a portion of the body 26. In some embodiments, the first surface 22 (or a portion thereof) is positioned between the first end 284 of the insert 28 and the second end 286 of the insert 28. The body 26 and the insert 28 can be combined by the insert 28 being press-fit into the opening 268 of the body 26. Press-fitting the body 26 and the insert 28 can create a solid body contact between the two. In some embodiments, the body 26 is tin plated prior to being combined with the insert 28. Tin plating can be useful for limiting galvanic corrosion, e.g., at an interface or contact point between the body 26 and the insert 28. In some embodiments, the body 26 is tin plated and the insert 28 comprises copper.

As shown in FIG. 1, the clamp member 30 can include a first clamp surface 32 adjacent to the second surface 24 of the main housing portion 20. The first clamp surface 32 can be sized to engage a portion of a conductor (e.g., the second conductor). For example, the first clamp surface 32 can be a curved surface. The first clamp surface 32 and the second surface 24 can be aligned in a facing relationship. The first clamp surface 32 of the clamp member 30 and the second surface 24 of the main housing portion 20 can cooperatively form at least a portion of a channel therebetween. The channel formed between the first clamp surface 32 and the second surface 24 of the main housing portion 20 can be configured to receive the second conductor. Because the clamp member 30 is movable relative to the main housing portion 20, the channel between the first clamp surface 32 and the second surface 24 of the main housing portion 20 can have a variable width to accommodate a variety of conductor sizes. The clamp member 30 can also include a first portion and a second portion. The first clamp surface 32 can be positioned on the first portion of the clamp member 30. The second portion can be coupled to the first portion. The second portion of the clamp member 30 can have an internal hole or opening that can receive a shaft of the linear actuator 50. The opening can be aligned along the longitudinal axis 266 of the body 26.

As shown in FIG. 1, the clamp 10 can include a fastener 40 that is adjacent to the first surface 22 of the main housing portion 20. The fastener 40 can be used to secure a conductor to the clamp 10 and main housing portion 20 thereof. For example, the fastener 40 can be coupled to the body 26 via the aperture 270. The fastener 40 can be movably coupled to the main housing portion 20. The fastener 40 can be any suitable fastener that can secure a conductor to the main housing portion 20. Examples of fasteners 40 include, but are not limited to, an eyebolt, screw eye, and the like. In some embodiments, the fastener 40 is an eyebolt. The fastener 40 can be configured to receive a conductor (e.g., the first conductor) and bring the conductor into contact with the first surface 22 of the main housing portion 20. Because the fastener 40 is movable relative to the main housing portion 20, the fastener can accommodate a variety of conductor sizes.

The linear actuator 50 can also be used for helping to secure a conductor to the clamp 10. As mentioned above, the linear actuator 50 can include a shaft. The linear actuator 50 and shaft can be aligned (and extend) along the longitudinal axis 266 of the body 26. The shaft can couple the main housing portion 20 and the clamp member 30. The linear actuator 50 and shaft can be at least partially received by the bore 264 of the body 26. The shaft can include a threaded portion. The threaded portion can threadably engage with the bore 264 of the body 26. In the illustrated embodiment of FIG. 1, the actuator 50 is an eyebolt.

III. Example Operations

Also disclosed herein are methods for providing electrical communication between a first conductor and a second conductor. Description of the example structures listed above can be applied to the methods for providing electrical communication between a first conductor and a second conductor. The methods can include aligning (e.g., by an operator) the fastener 40 of the clamp 10 to attach the first conductor to the main housing portion 20. An operator can insert the first conductor through the fastener 40, and then movably displace the fastener 40 such that the fastener 40 brings the first conductor into contact with the first surface 22 of the main housing portion 20. In addition, the fastener 40 can secure the first conductor to the main housing portion 20 such that the first conductor maintains contact with the first surface 22.

To insert the second conductor, the operator can position the second conductor between the second surface 24 of the main housing portion 20 and the first clamp surface 32 of the clamp member 30. The operator can thread the linear actuator 50 along the main housing portion 20 in order to move the clamp member 30 closer to the second surface 24. For example, the operator can actuate the shaft extending through the main housing portion 20 and the clamp member 30 to decrease a distance between the second surface 24 of the main housing portion 20 and the first clamp surface 32 of the clamp member 30. This movement can secure the second conductor between the second surface 24 of the main housing portion 20 and the first clamp surface 32 of the clamp member 30. As mentioned above, the shaft can have a threaded portion, which when the operator is actuating the shaft can rotate the shaft relative to a threaded member, thereby causing the threaded member to pull the clamp member 30 toward the main housing portion 20.

In some embodiments, the second conductor is a live conductor. And, when both the first conductor and the second conductor are attached to the clamp 10, an electric current can travel from the second conductor through the main housing portion 20 and into the first conductor. In addition, and as mentioned above, the electric current from the second conductor can travel through a conductive path created by the insert 28 and into the first conductor. In some embodiments, the clamp 10 can be used for high ampacity applications.

Although some aspects have been described in detail with reference to certain preferred embodiments, variations and modifications exist within the scope and spirit of one or more independent aspects as described. Various features and advantages are set forth in the following claims.

For reasons of completeness, various aspects of the invention are set out in the following numbered clauses:

Clause 1. A clamp for providing electrical communication between a first conductor and a second conductor, the clamp comprising: a main housing portion including a first surface, a second surface, a body, and an insert, the insert providing electrical communication between the first surface and the second surface; a clamp member including a first clamp surface adjacent the second surface of the main housing portion in a facing relationship; and a fastener movably coupled to the main housing portion, the fastener adjacent to the first surface of the main housing portion.

Clause 2. The clamp of clause 1, wherein the body has a resistivity that is different than the resistivity of the insert.

Clause 3. The clamp of clause 1, wherein the body has a resistivity that is greater than the resistivity of the insert.

Clause 4. The clamp of any one of clauses 1-3, wherein the insert has a resistivity of less than $5 \times 10^{-6}$ ohm-cm.

Clause 5. The clamp of any one of clauses 1-4, wherein the insert comprises copper, aluminum, or a combination thereof.

Clause 6. The clamp of any one of clauses 1-5, wherein the insert comprises copper, aluminum, or a combination thereof at greater than 97% by weight of the insert.

Clause 7. The clamp of any one of clauses 1-6, wherein the body comprises aluminum at less than 97% by weight of the body.

Clause 8. The clamp of any one of clauses 1-7, wherein the body is at least partially tin plated.

Clause 9. The clamp of any one of clauses 1-8, wherein the fastener is configured to receive the first conductor and bring the first conductor into contact with the first surface of the main housing portion.

Clause 10. The clamp of any one of clauses 1-9, wherein the second surface of the main housing portion and the first clamp surface of the clamp member cooperatively form at least a portion of a channel therebetween, the channel configured to receive the second conductor.

Clause 11. The clamp of any one of clauses 1-10, further comprising a shaft extending along a longitudinal axis of the body, the shaft coupling the main housing portion and the clamp member.

Clause 12. The clamp of clause 11, wherein the first clamp surface is positioned on a first portion of the clamp member, the clamp member including a second portion having an internal hole receiving the shaft.

Clause 13. A clamp for providing electrical communication between a first conductor and a second conductor, the clamp comprising: a main housing portion including a body and an insert, the insert comprising a first surface and a second surface and having a lower resistivity relative to the body; a clamp member including a first clamp surface adjacent the second surface of the insert in a facing relationship; and a fastener movably coupled to the body of the main housing portion, the fastener adjacent to the first surface of the insert.

Clause 14. The clamp of clause 13, wherein the body has a resistivity that is at least 2× greater than the resistivity of the insert.

Clause 15. The clamp of clause 13 or clause 14, wherein the fastener is configured to receive the first conductor and bring the first conductor into contact with the first surface of the insert.

Clause 16. The clamp of any one of clauses 13-15, wherein the second surface of the insert and the first clamp surface of the clamp member cooperatively form at least a portion of a channel therebetween, the channel configured to receive the second conductor.

Clause 17. A method for providing electrical communication between a first conductor and a second conductor, the method comprising: attaching the first conductor to a main housing portion, the main housing portion including a body and an insert, the insert in electrical communication between a first surface of the main housing portion and a second surface of the main housing portion; positioning the second conductor between the second surface of the main housing portion and a first clamp surface of a clamp member; and actuating a shaft extending through the main housing portion and the clamp member to decrease a distance between the second surface of the main housing portion and the first clamp surface of the clamp member to secure the second conductor between the second surface of the main housing portion and the first clamp surface of the clamp member.

Clause 18. The method of clause 17, wherein the insert has a lower resistivity relative to the body.

Clause 19. The method of clause 17 or clause 18, wherein at least a portion of the shaft is threaded, and actuating the shaft rotates the shaft relative to a threaded member, thereby causing the threaded member to pull the clamp member toward the main housing portion.

Clause 20. The method of any one of clauses 17-19, wherein the first conductor is attached to the main housing portion through a fastener such that the first conductor contacts the first surface of the main housing portion.

What is claimed is:

1. A clamp for providing electrical communication between a first conductor and a second conductor, the clamp comprising:
   a main housing portion including a first surface, a second surface, a body, and an insert, the insert providing electrical communication between the first surface and the second surface;
   a clamp member including a first clamp surface adjacent the second surface of the main housing portion in a facing relationship; and
   a fastener movably coupled to the main housing portion, the fastener adjacent to the first surface of the main housing portion,
   wherein the body has a resistivity that is different than the resistivity of the insert.

2. The clamp of claim 1, wherein the body has a resistivity that is greater than the resistivity of the insert.

3. The clamp of claim 1, wherein the insert has a resistivity of less than 5×10-6 ohm-cm.

4. The clamp of claim 1, wherein the insert comprises copper, aluminum, or a combination thereof.

5. The clamp of claim 1, wherein the insert comprises copper, aluminum, or a combination thereof at greater than 97% by weight of the insert.

6. The clamp of claim 1, wherein the body comprises aluminum at less than 97% by weight of the body.

7. The clamp of claim 1, wherein the body is at least partially tin plated.

8. The clamp of claim 1, wherein the fastener is configured to receive the first conductor and bring the first conductor into contact with the first surface of the main housing portion.

9. The clamp of claim 1, wherein the second surface of the main housing portion and the first clamp surface of the clamp member cooperatively form at least a portion of a channel therebetween, the channel configured to receive the second conductor.

10. The clamp of claim 1, further comprising a shaft extending along a longitudinal axis of the body, the shaft coupling the main housing portion and the clamp member.

11. The clamp of claim 10, wherein the first clamp surface is positioned on a first portion of the clamp member, the clamp member including a second portion having an internal hole receiving the shaft.

12. The clamp of claim 1, wherein the insert is press-fit into the body.

13. A clamp for providing electrical communication between a first conductor and a second conductor, the clamp comprising:
   a main housing portion including a body and an insert, the insert comprising a first surface and a second surface and having a lower resistivity relative to the body;
   a clamp member including a first clamp surface adjacent the second surface of the insert in a facing relationship; and
   a fastener movably coupled to the body of the main housing portion, the fastener adjacent to the first surface of the insert.

14. The clamp of claim 13, wherein the first surface of the insert is configured to engage a first conductor and the second surface of the insert is configured to engage a second conductor.

15. The clamp of claim 13, wherein the fastener is configured to receive the first conductor and bring the first conductor into contact with the first surface of the insert.

16. The clamp of claim 13, wherein the second surface of the insert and the first clamp surface of the clamp member cooperatively form at least a portion of a channel therebetween, the channel configured to receive the second conductor.

17. A method for providing electrical communication between a first conductor and a second conductor, the method comprising:
   attaching the first conductor to a main housing portion, the main housing portion including a body and an insert, the insert in electrical communication between a first surface of the main housing portion and a second surface of the main housing portion and having a lower resistivity relative to the body;
   positioning the second conductor between the second surface of the main housing portion and a first clamp surface of a clamp member; and
   actuating a shaft extending through the main housing portion and the clamp member to decrease a distance between the second surface of the main housing portion and the first clamp surface of the clamp member to secure the second conductor between the second surface of the main housing portion and the first clamp surface of the clamp member.

18. The clamp of claim 13, wherein the insert is press-fit into the body.

19. The method of claim 17, wherein at least a portion of the shaft is threaded, and actuating the shaft rotates the shaft relative to a threaded member, thereby causing the threaded member to pull the clamp member toward the main housing portion.

20. The method of claim 17, wherein the first conductor is attached to the main housing portion through a fastener such that the first conductor contacts the first surface of the main housing portion.

* * * * *